United States Patent
Hasegawa

(10) Patent No.: US 6,693,542 B2
(45) Date of Patent: Feb. 17, 2004

(54) ELECTRONIC ARTICLE SURVEILLANCE MARKERS FOR RECORDED MEDIA

(76) Inventor: Ryusuke Hasegawa, 29 Hill St., Morristown, NJ (US) 07960

( * ) Notice: Subject to any disclaimer, the term of this patent is extended or adjusted under 35 U.S.C. 154(b) by 96 days.

(21) Appl. No.: 10/002,503

(22) Filed: Nov. 15, 2001

(65) Prior Publication Data

US 2003/0090380 A1 May 15, 2003

(51) Int. Cl.[7] ............................................. G08B 13/14
(52) U.S. Cl. ........................ 340/572.8; 340/572.3; 340/572.6; 360/135; 369/273; 369/282; 235/493
(58) Field of Search .................... 340/572.8, 572.1, 340/572.3, 572.7, 572.9, 572.6; 360/135, 314, 137; 361/600; 369/273, 272, 282, 289; 156/297; 292/307 R; 235/493

(56) References Cited

U.S. PATENT DOCUMENTS

| | | | |
|---|---|---|---|
| 4,510,489 A | | 4/1985 | Anderson, III et al. .. 340/572.1 |
| 4,510,490 A | | 4/1985 | Anderson, III et al. .. 340/572.1 |
| 4,553,136 A | | 11/1985 | Anderson, III et al. .. 340/572.2 |
| 4,581,524 A | * | 4/1986 | Hoekman et al. ............ 235/493 |
| 4,665,387 A | * | 5/1987 | Cooper et al. .............. 340/572.3 |
| 4,692,746 A | * | 9/1987 | Budin et al. ............... 340/572.5 |
| 4,910,625 A | * | 3/1990 | Albrecht et al. ............ 360/135 |
| 5,012,380 A | * | 4/1991 | Harissis et al. ............. 360/135 |
| 5,246,522 A | * | 9/1993 | Cordery et al. ............. 156/297 |
| 5,347,508 A | * | 9/1994 | Montbriand et al. ........ 369/273 |
| 5,351,033 A | * | 9/1994 | Liu et al. .................. 340/572.6 |
| 5,699,047 A | | 12/1997 | Tsai et al. ................. 340/572.6 |
| 5,910,770 A | * | 6/1999 | Ohara ....................... 340/572.5 |
| 5,984,388 A | * | 11/1999 | Bacon ...................... 292/307 R |
| 6,525,661 B2 | * | 2/2003 | Tsai ......................... 340/572.4 |

FOREIGN PATENT DOCUMENTS

| | | |
|---|---|---|
| DE | 42 42 992 | 6/1994 |
| DE | 196 53 931 | 6/1998 |
| EP | 0 628 936 | 12/1994 |

* cited by examiner

Primary Examiner—Benjamin C. Lee
(74) Attorney, Agent, or Firm—Ernest D. Buff & Associates, LLC; Ernest D. Buff; Gordon E. Fish

(57) ABSTRACT

A harmonic responsive electronic article surveillance marker is associated with a central, non-recorded region and/or a peripheral non-recorded region of an optically recorded or recordable media. The marker comprising at least one elongated strip, optionally having an arcuate configuration, and composed of soft magnetic material adapted to generate a harmonic signal voltage in the presence of an applied magnetic field which provides the marker with signal identity. Advantageously, the marker is inexpensive to construct. It is readily attached to or embedded in the non-recorded region and/or the peripheral non-recorded region, and generates a high amplitude, harmonic signal voltage having significantly increased detection sensitivity. With these attributes, the marker is especially suited for electronic surveillance of recorded media such as compact disks, digital video disks, laser disks and the like.

20 Claims, 8 Drawing Sheets

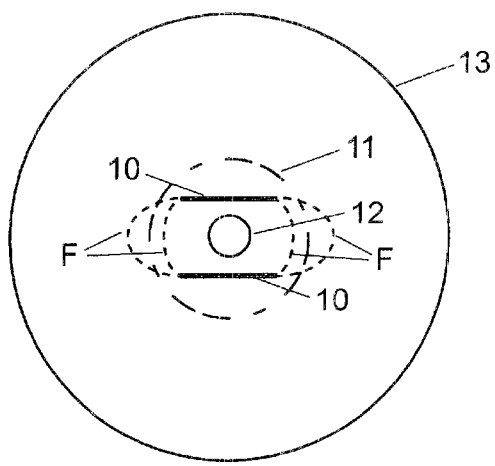
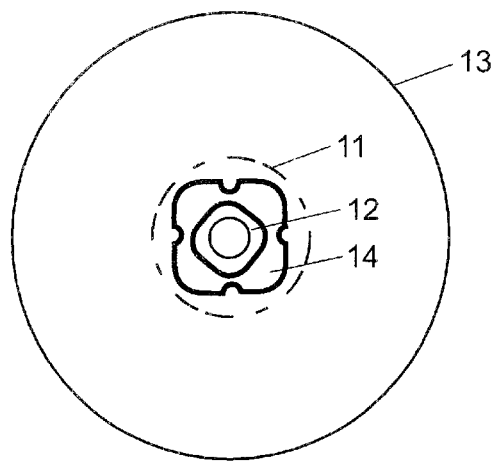
Fig. 1a
Prior Art
Fig. 1b
Prior Art

ELECTRONIC ARTICLE SURVEILLANCE MARKERS FOR RECORDED MEDIA

BACKGROUND OF THE INVENTION

1. Field of the Invention

This invention relates to magnetic markers for electronic surveillance of recorded media; and more particularly to the identification of pre-recorded or recordable disks, such as compact disks, digital video disks, laser disks and the like, as well as cartridges or cassettes and the like, by magnetic markers of electronic article surveillance systems, based on magnetic harmonic generation and detection.

2. Description of the Prior Art

Inventory control is a major consideration in wholesale and retail sales. Inventory control includes anti-theft and anti-pilferage considerations so to minimize lost profits. Various devices and various techniques are known to limit theft and recently amongst the most successful are the use of electronic article surveillance systems ("EAS"), which include a marker affixed to an item, and a sensor means that can detect the marker. Typically, such sensor means are devices which are strategically placed in suitable locations, often described as "interrogation zones" i.e., points of entry or exit where wholesale and retails sales may take place, or locations through which the transport of vendible articles may occur.

Currently there are two EAS systems in wide use that employ techniques based on magnetics. A first technique involves detecting higher harmonic signals generated by a magnetic marker excited at a given fundamental frequency. In this case higher harmonics are integral multiple of the fundamental frequency. There are, therefore, a number of different methods of operations that are conceivable depending on the needs and objectives for the envisaged types of surveillance. Advances in this class of technology have been made, including the development of markers whose performance is not affected when they are flexed or bent. Such are known, for example in U.S. Pat. No. 4,553,136. A second technique is based on the magneto-mechanical properties of magnetostrictive strips that are used as markers. Examples of this second technique are disclosed, for example, in U.S. Pat. No. 4,510,489 and 4,510,490.

The present invention relates to the former class of EAS systems, viz., those based on magnetic harmonics. In such systems, a magnetic marker comprising of one or more magnetically "soft" strips is excited in an interrogation zone by an external oscillating magnetic field at a fundamental frequency. Because of the non-linear magnetization behavior of the soft magnetic strip or strips in the marker, the magnetic response may be measured as an electrical signal that is detectable by the sensor means in the interrogation zone. The electrical signal detected by the sensor means in the interrogation zone contains both higher harmonic signals as well as a signal at the aforesaid fundamental frequency. According to this technique, by selecting a specific harmonic signal to track, the sensor means in the interrogation zone may identify the magnetic state of the magnetic marker, (i.e., 'activated', or 'deactivated'). When such a magnetic marker is 'activated', the sensor means may sense such a condition and may in turn trigger an alarm when an unauthorized vendible article is placed in the interrogation zone. Such a magnetic marker is normally in an activated state and can be used repeatedly. When it is desired to permit a vendible article bearing a marker safe passage through the interrogation zone, the marker must be deactivated. Typically, when deactivation is needed, a magnetically semi-hard magnet or magnets are attached to, or placed in close proximity with the soft magnetic strip or strips. Deactivation is accomplished by simply magnetizing the semi-hard magnet or magnets, which magnetically saturate the soft magnetic strip or strips, resulting in essentially no higher harmonics in the detection signal. The presence or absence of higher harmonics in the detection signal, detectable by the sensor means, determines the nature of the article in the interrogation zone, thereby establishing a condition which can be used to determine if an alarm or other indicator should be activated or deactivated. Such a marker may be used many times as it is readily re-activated by demagnetization of the semi-hard magnetic piece or pieces which, in turn, will desaturate the magnetically soft strip or strips of the marker.

Markers which include only one or more magnetically soft strips without semi-hard magnets, as well as those which include semi-hard magnets in contact with, or in near physical proximity to one or more magnetically soft strips are known to the art.

Such EAS markers described above have been used for surveillance of many types of vendible articles. Typically they are conveniently provided as small tags, strips or casings which include the requisite one or more magnetically soft strips and optionally but very frequently also include one or more semi-hard magnets in contact with, or in near physical proximity to one or more magnetically soft strips. Such markers are very conveniently adhered to a vendible article or its packaging or can also be hidden within the interior of the same. Such markers are very cost effective and have found widespread use in inventory control of many classes of vendible goods.

However, the use of such markers has met with only limited success when used with pre-recorded or recordable media. By way of non-limiting example these include; disk media such as compact disks ("CD", "CD-R", "CD-RW"), digital video disks ("DVD"), larger formatted laser disks ("LD") and the like, as well as cassette media which includes videocassettes (such as "VHS" full-size and micro cassettes) and recordable or prerecorded audio cassettes as well as DAT cassettes, and the like. Generally markers are placed on the packages containing these media, which however can be easily circumvented. For greatest effect in inventory control, markers are ideally attached directly to the recordable/recorded media. U.S. Pat. No. 5,699,047 discloses certain such markers, and recites that these markers can be used for disks which have one, or two optically recorded surfaces. Unfortunately, the magnetic strips placed on a disk with two optically recorded surfaces according to the teachings of U.S. Pat. No. 5,699,047, however, are not properly configured so that effective surveillance is difficult to achieve.

In certain embodiments described in U.S. Pat. No. 5,699,047, the marker strips are essentially magnetically closed, due to magnetic proximity of the two strips. Therefore, in such a configuration the marker strips do not emanate a sufficiently strong magnetic field outside the disk area in response to a sensor means in a typical interrogation zone. Detection of the presence of a marker at some distance from the sensor means becomes increasingly difficult as the distance increases. In a typical surveillance system, this distance between the marker and the detecting coil typically used in the sensor means is of the order of 1 to 2 meters. Where the excited magnetic field from the marker is insufficiently strong, as may be the case with the embodiments described in U.S. Pat. No. 5,699,047, the marker may pass through the interrogation zone undetected.

Accordingly there is a real and continuing need in the art for improved markers for electronic article surveillance systems which may be directly attached to recordable or recorded media. Especially needed are improved markers for electronic surveillance of optically recorded or recordable media such as compact disks, digital video disks, larger formatted laser disks, and the like.

There is also a real and continuing need in the art for improved inventory control techniques which employ electronic article surveillance systems, and improved markers which may be directly attached to recordable or recorded media.

There is also a real need in the art for improved media, either pre-recorded media, or recordable media, that comprises an improved marker capable of being sensed by electronic article surveillance systems.

There is a further need in the art for improved media, either pre-recorded media, or recordable media, which includes an improved marker integrated into the construction of the aforesaid media, the improved marker being capable of being sensed by electronic article surveillance systems.

There is also a need in the art for an improved method for manufacture of either pre-recorded media or recordable media, which method includes the step of associating directly with the such media an improved marker capable of being sensed by an electronic article surveillance system.

There is also a real need in the art for improved methods for manufacture of either pre-recorded media or recordable media, which method includes the step of integrating an improved marker capable of being sensed by electronic article surveillance systems directly with the aforesaid media during or subsequent to the manufacture of the aforesaid media.

These and other objects of the invention are fully met by one or more features of the invention described herein.

SUMMARY OF THE INVENTION

The present invention provides an improved marker having high detection sensitivity and especially suited for use with harmonic responsive electronic article surveillance systems. The improved marker has an elongated configuration. It makes use of the higher harmonic response of 'soft' magnetic materials, especially ferromagnetic amorphous metal strip or strips, that is generated when the strip is placed in the unrecorded area of recorded media, as well as in corresponding areas of recordable media which are capable of being recorded at a future time. As used herein, the term "recorded media" includes compact disks, laser disks, digital videodisks and the like, as well as cartridges or cassettes and the like. The term "elongated", as used herein, means that the marker has an aspect ratio of at least 20, preferably ranging from about 50 to 900, and most preferably from about 100 to 650. Elongated markers having these aspect ratios have a length typically ranging from about 30 mm to 180 mm, and preferably from about 50 mm to 170 mm, and more preferably from about 70 mm to 160 mm. Markers having aspect ratios of about 100 to 650 and lengths of about 70 mm to 160 mm generate strong signal voltages in the presence of an applied magnetic field, and are readily detected in a highly reliably manner. For these reasons, such markers are especially preferred.

In accordance with the present invention, a synergy produced by combining certain 'soft' magnetic materials and the marker's configuration maximizes detection sensitivity. Examples of particularly useful soft magnetic materials suited for the present invention include commercially available amorphous metals such as METGLAS® 2714A, METGLAS® 2705M, METGLAS® 2827A and the like. These soft magnetic materials are commercially provided in long strips or ribbons; but are readily cut into appropriately configured shapes especially suited for use with the present invention in the manner described hereinafter. Ferromagnetic amorphous metals of the class described herein exhibit high magnetic permeabilities and low coercivities. Markers of the present invention having these alloy attributes produce large harmonic signal responses which may be readily detected by sensor means of electronic article surveillance systems. It will be understood by those skilled in the art that although these amorphous metals, or "glassy alloys" as they are often interchangeably referred to, are preferably utilized in the improved markers of the invention, other magnetizable materials that provide suitably high magnetic permeabilities and suitably low coercivities may also be used. Such materials are considered to be within the scope of the present invention, as defined by the subjoined claims. Amorphous metal strips exhibit excellent magnetic softness and ductility, and are readily shaped or cut. For these reasons, ferromagnetic amorphous metals are preferred.

In one aspect of the invention, there is provided an improved inventory control method wherein the improved markers, appointed for detection by an electronic article surveillance system, are attached to recordable or recorded media. In this method, the improved markers are directly associated with the prerecorded or recordable media. The markers are interrogated by an interrogation field of a preselected frequency in an interrogation zone in order to determine the status of the said marker. In the interrogation zone the marker is subjected to an oscillating magnetic field having a preselected frequency, also referred to as the interrogation field, and the magnetic response of the marker is detected by a sensor means. The sensor means typically includes a detecting coil in the interrogation zone. However, it may comprise any other device so long as the sensor means is capable of detecting signals containing higher harmonics of the aforesaid given frequency of the interrogating field. The improved inventory control method comprises of the steps of (a) subjecting an improved marker directly attached to recordable or recorded media to an interrogation field; (b) comparing detected signal or signals of the marker as it is subjected to the interrogating field; and (c) comparing the detected signal or signals to a predetermined signal characteristic, such as determining whether the detected signal or signals contain higher harmonics of a given frequency. A further optional step comprises providing information related to the surveillance status of the improved marker directly attached to recordable or recorded media which may be used to signal a further device, such as an alarm, a counter, and the like.

In still further aspect of the invention there are provided improved methods for the manufacture of recordable or recorded media. Such methods include directly affixing an improved marker to the surface of such recordable or recorded media, or embedding it therewithin. The steps of these improved methods may be carried out during or subsequent to the manufacture of the recordable or recorded media. Each of the affixing and embedding steps, as well as their beneficial effects are applicable to either recordable or recorded media.

BRIEF DESCRIPTION OF THE DRAWINGS

The invention will be more fully understood and further advantages will become apparent when reference is had to the following detailed description of the preferred embodiment of the invention and the accompanying drawings, in which:

FIG. 1a is a plan view of a compact disc showing a prior art marker configuration in which magnetic strips 10 are arranged in parallel across the central hole 12 for disk seat, the area between 11 and 13 comprising the optically recorded section and the area between 11 and 12 comprising the non-recorded section of optically recorded media;

FIG. 1b is a plan view of a compact disc comprising a prior art marker 14 placed in the unrecorded region of an optical disk;

DESCRIPTION OF THE PREFERRED EMBODIMENTS

Referring to FIG. 1a, there is shown, a prior art marker configuration according to U.S. Pat. No. 5,699,047 in which two magnetic strips 10 are arranged in parallel across opposite sides of central hole 12 for a disk seat. The area between 11 and 13 is the recorded (or recordable) section and the area between 11 and 12 is the non-recorded (or non-recordable) section of recorded media. Such a configuration is typical of compact disks including "CD", "CD-R", "CD-RW", digital video disks "DVD" disks, larger formatted laser disks ("LD") and the like, all of which are characterized as being optically recorded or optically recordable.

In FIG. 1b there is shown an example of a prior art marker 14 according to U.S. Pat. No. 5,699,047, placed in the unrecorded region of an optical disk. As shown by the figure, the prior art marker 14 has essentially a generally square casing enclosing a soft magnetic material, defined by an outer margin which includes rounded corners at each of the four corners of the casing. The casing further includes a smaller interior square cutout whose margins also have rounded corners at each of the four corners. The cutout is wholly enclosed within the generally square casing of a soft magnetic material. Both the smaller interior square cutout and outer margin of the generally square casing of a soft magnetic material are concentric with respect to the central hole 12, although the former is rotationally displaced by approximately 45 degrees with respect to the outer margins of the latter.

A shortcoming inherent to prior art markers, particularly those exemplified by the arrangement of magnetic strips depicted in FIG. 1a is that prior art markers typically generate only relatively poor magnetic flux when the magnetic markers or strips are excited by an appropriate magnetic field. Turning to FIG. 1a, it is evident that the two spaced apart, paralleled arranged magnetic strips, when excited, generate flux lines approximately depicted by lines "F". Each of these flux lines bridges opposite corresponding ends of the two spaced-apart magnetic strips. These flux lines are not strong, and do not extend generally outwardly so as to make the marker more likely to be detected by a sensing device. As shown by FIG. 1b, flux lines generated in a prior-art marker are confined essentially in the marker and therefore cannot be detected away from the marker. Such marginally effective, prior art configurations and arrangements of magnetic markers generally exhibit poor detectability and inferior performance characteristics.

Figure 2A:
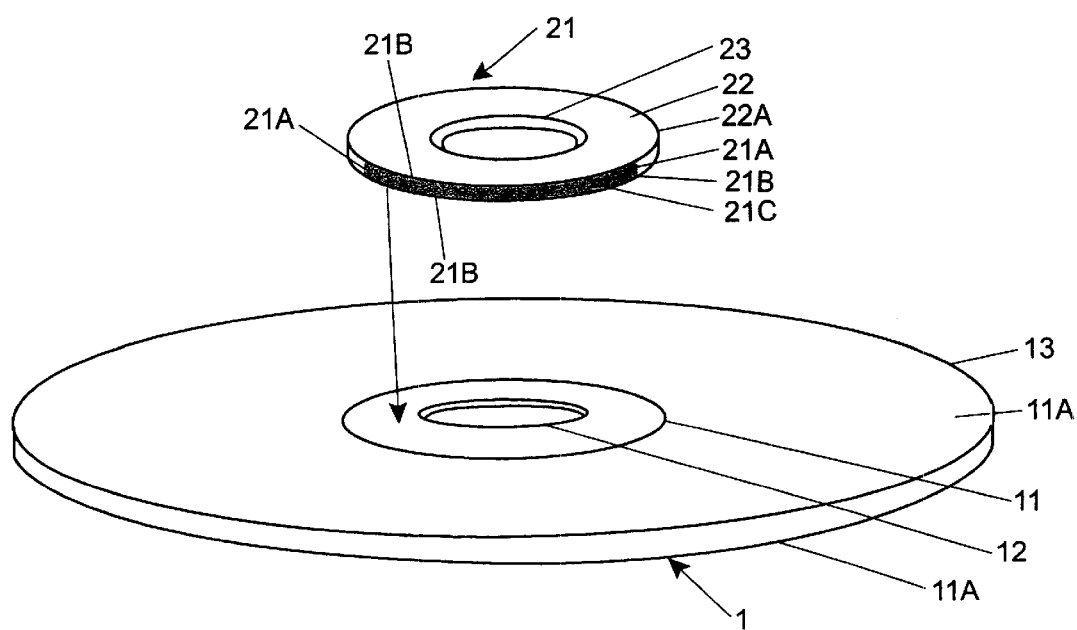
FIG. 2a is a perspective view, partially broken away, showing a marker configuration of the present invention in which a magnetic strip 21 is housed upon or inside a thin element 22 to be attached to the central unrecorded portion between 11 and 12 of an optical disk, the diameters of the holes 12 and 23 being close to, or equal to one another.

Turning now to FIG. 2a there is shown an embodiment of the improved marker according to the present invention. As illustrated, at least one arcuate magnetic strip 21 is associated with media 1. The arcuate magnetic strip 21 has two ends 21A and parallel edges 21B, all of which bound the opposite faces 21C and 21D (not visible in FIG. 2a) of the arcuate magnetic strip 21. Arcuate magnetic strip 21 is adhered to or otherwise affixed to the outer peripheral wall 22A of a hub 22. The hub 22 bearing the arcuate magnetic strip 21 includes a central hole 23, which is suitably dimensioned to be equal in diameter to, or may be of a greater diameter than the central hole of the media 1. The marker may be adhered to, or otherwise affixed to the media 1 such that the central hole 23 is concentric with the central hole 12 of the media.

As will be understood by reference to FIG. 2a, a feature of the improved marker 21 relates to its configuration, as well as the ultimate position of the magnetic strip 21 relative to the media with which it is associated. In this embodiment, the magnetic strip 21 is oriented such that its faces are ultimately perpendicular to the face(s) 11A of the optically recorded/optically recordable section of the media 1. In such a relative orientation, the magnetic strip 21 forms an improved marker according to the invention. These relative placements and orientations are more readily understood with reference to FIG. 2a, where it can be foreseen that when the hub 22 bearing the arcuate magnetic strip 21, is affixed to the media 1, the faces 21C, 21D are perpendicular to the media. As can also be seen from FIG. 2a the arcuate magnetic strip 21 has a larger aspect ratio than certain prior art designs, which makes it possible to emanate more detectable magnetic fields responsive to an interrogation field at a larger distance from sensing means. This is particularly true as compared to the prior art marker configuration depicted in FIG. 1.

In accordance with a variation on the configuration of FIG. 2a, it may be desired to further include a balance strip (not shown in FIG. 2a) on the outer peripheral wall 22A of the hub 22 and located on the opposite side and across the central hole 23. Such a further strip is non-magnetic and need not be a strip but can take any other configuration. Ideally such a balance strip has a mass equal to or approximately equal to the mass of the magnetic strip 21 and functions as a counterbalance. This is particularly useful in improving the dynamic balance of the media 1 when rotated.

In either embodiment, both with or without the further balance strip, the hub 22 in FIG. 2a is conveniently attached onto the central portion of the media 1.

Figure 2B:
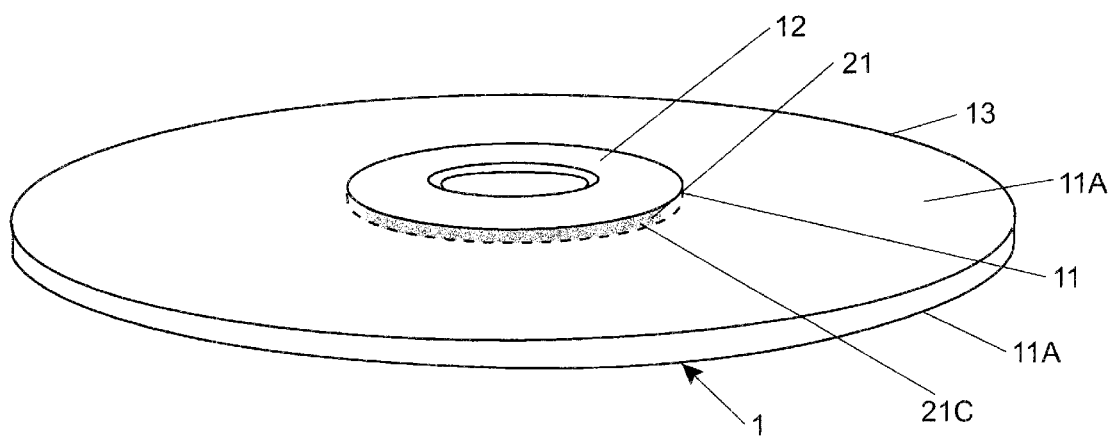
FIG. 2b is a perspective view showing an optical disk with a magnetic marker 21 embedded in the unrecorded part of the disk at or near edge region 11.

In a further embodiment, illustrated on FIG. 2b, the magnetic strip 21 is embedded within the interior of the media 1 such that the face 21C is approximately perpendicular to the face(s) 11A of the optically recorded/optically recordable section of the media 1. In such an orientation, the magnetic strip 21 forms an improved marker according to the invention. As the magnetic strip 21 is incorporated into the interior of the media 1, it is not readily removed and thus is not easily defeated.

In a variation of the embodiment illustrated on FIG. 2b, again it may be desired to include a balance strip having a mass that equals, or approximately equals, the mass of the magnetic strip 21. The balance strip functions as a counterbalance, and finds particular use in improving the dynamic balance of the media 1, when rotated.

The strip 21, and when included, a balance strip, can be embedded at the disk's manufacturing site.

Figure 2C:
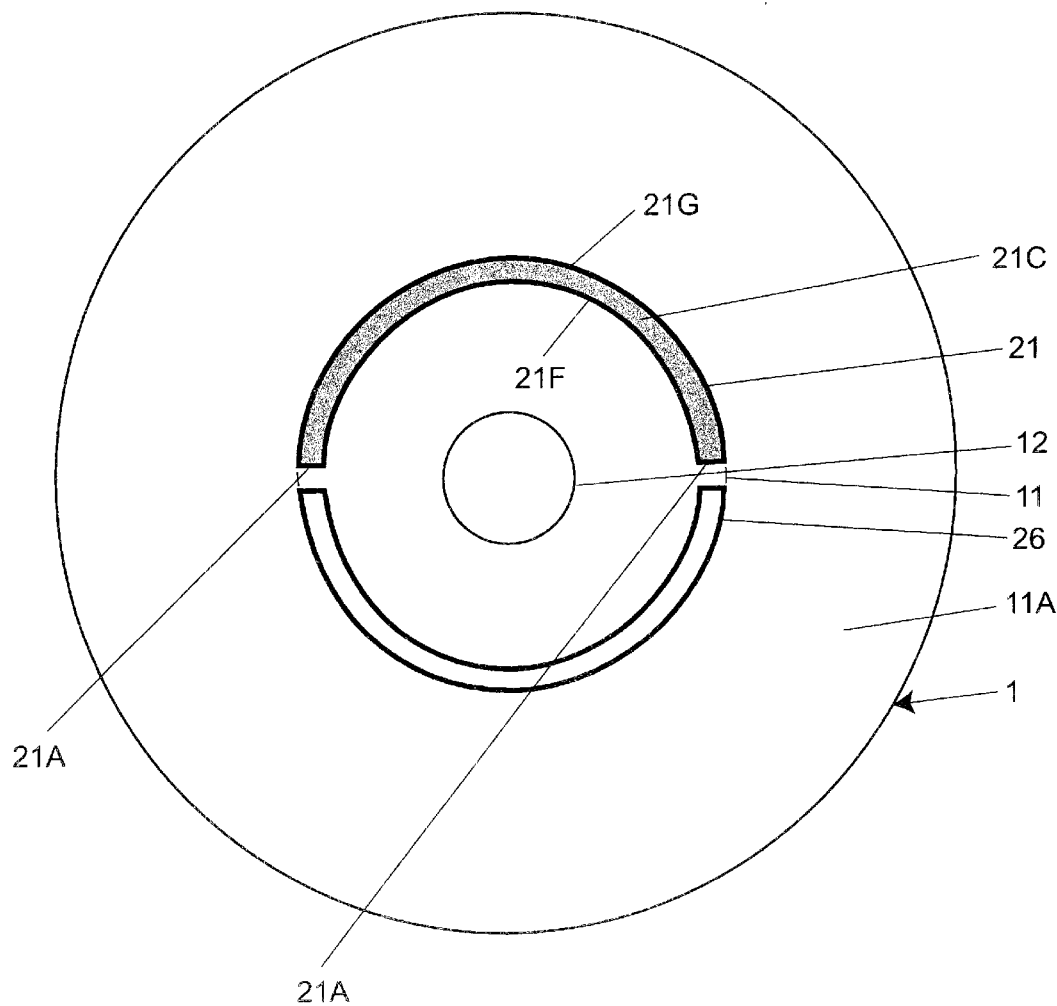
FIG. 2c is a plan view depicting a marker of the present invention in which a magnetic arcuate strip 21 is attached on the surface of the disk in the unrecorded region between 11 and 12 of an optical disk, and a counterbalance 26 of a non-magnetic material weighing about the same weight as the strip 21 is also attached in the unrecorded region of the disk.

In FIG. 2c there is illustrated a further embodiment of the invention. The embodiment of FIG. 2c differs from the embodiments of FIGS. 2a and 2b in that the magnetic strip 21 is arcuate, but is configured such that its faces 21C and 21D (not visible in FIG. 2c) are parallel to the faces 11A of the media 1. With reference to FIG. 2e, the magnetic strip includes two ends 21A, an inner margin 21F, and outer margin 21G bounding the faces 21C and 21D of the magnetic strip 21. As is readily apparent from FIG. 2c, the arcuate magnetic strip 21 has a larger aspect ratio than certain prior art designs, which makes it possible to emanate more detectable magnetic fields responsive to an interrogation field at a larger distance from sensing means. Such an arcuate magnetic strip 21 illustrated on FIG. 2c provides an alternative embodiment of an improved marker according to the invention.

As in the prior embodiments, it may be advantageous to include a balance strip 26 in the embodiment illustrated on FIG. 2c. When present, such a balance strip is a further arcuate strip, which is made of a non-magnetic material. Preferably the balance strip 26 is positioned across the center hole 12 so to improve the dynamic balance of the media 1 when rotating.

A key feature of the present invention lies in the fact that the arrangement of the magnetic marker in an arcuate configuration permits the magnetic marker to emanate a more detectable magnetic field responsive to an interrogation field at a larger distance from sensing and means. This of course will increase the efficacy of the use of the magnetic marker in many applications. The arcuate configuration, which provides a larger aspect ratio than many prior art designs, generates a more detectable magnetic flux when the magnetic marker is excited; these flux lines are approximated by lines "H" on FIG. 2c. Although the strength of the flux will depend upon the exciting power exerted upon the arcuate strip 21, the flux lines extend outwardly and at a greater distance from the magnetic marker of the arcuate strip 21, thereby providing improved detectability over the prior art marker configurations described hereinabove. This advantageous feature is observable in the other embodiments of the invention which include arcuate strips, such as those depicted in FIGS. 2a, 2b, 2c, and FIG. 3. It is only required that an approved aspect ratio over prior art designs, such as that provided by an arcuate magnetic strip, be provided.

Figure 3:
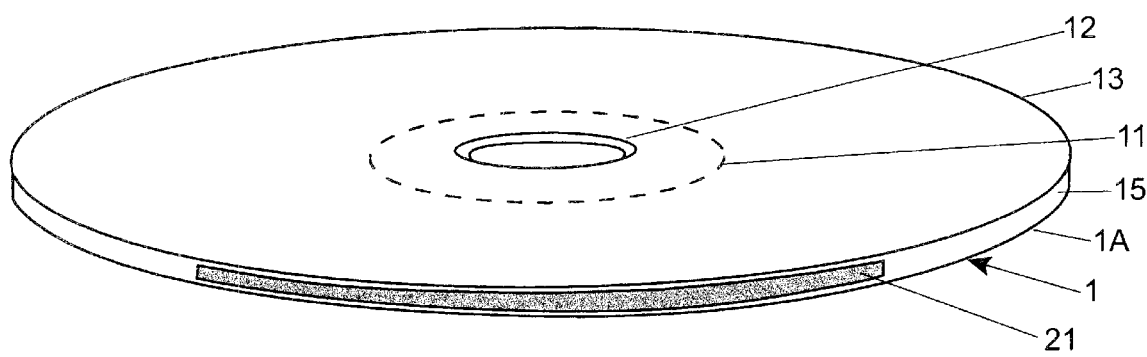
FIG. 3 is a perspective view showing a marker configuration of the present invention in which a magnetic strip 21 is attached on the peripheral rim surface 13 of an optical disk, and a non-magnetic counterbalance strip is attached on the other side of the rim surface 13, although not visible in FIG. 3.

A further embodiment of the invention is illustrated by FIG. 3. Therein is shown a media 1 having an improved marker in the form of an arcuate strip 21 affixed to the peripheral edge 1A of the media 1. As the thickness of recorded media is slightly larger than 1 mm, it is usually is wide enough to attach thereto an arcuate magnetic strip 21 which responds effectively to an interrogation field. While not shown, it may be desired to provide a balance strip in the embodiment illustrated on FIG. 3. As in the previously discussed embodiments, such a balance strip may be positioned anywhere on the media 1 in order to improve the dynamic balance of the media 1. In the embodiment of FIG. 3 such a balance strip, when included, is conveniently positioned on the peripheral edge 1A opposite to the position of the arcuate strip 21.

Further useful contemplated modifications of the embodiment of FIG. 3 vary only in that the arcuate strip 21 is embedded in, or near the peripheral edge 1A of the media 1. Optionally, a balance strip (or other balance mass) may also be embedded in the media 1 as well. Alternately, as the peripheral edge 1A is large, more than one magnetic strip 21 can also be placed therein or thereon such that two or more magnetic strips 21 may be present.

Figure 4:
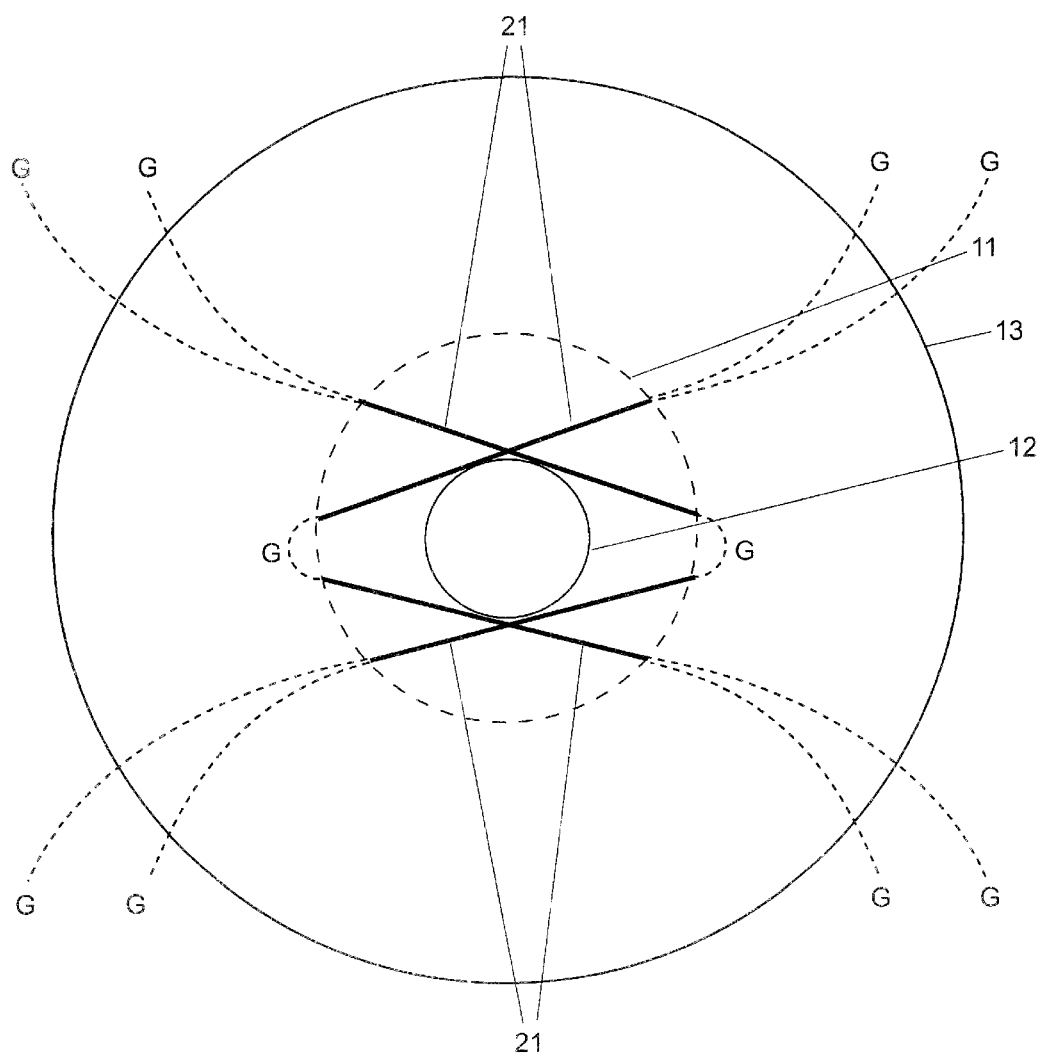
FIG. 4 is a plan view of an optical disc showing a marker configuration of the present invention with segmented magnetic strips 21 arranged to maximize harmonic signals emanating from the strips.

FIG. 4 illustrates a further embodiment of an improved marker according to the present invention. Therein are illustrated two sets of intersecting magnetic strips 21 each of which is embedded within the media 1 which might alternately be attached to the surface of the disk 1. As can be seen from FIG. 4, each pair of intersecting magnetic strips 21 is positioned such that the strips 21 do not intersect the center hole 12, or extend into the recordable area of the media 1. The intersecting magnetic strips 21 provide a larger aspect ratio than prior art designs, which larger aspect ratio makes it possible to emanate more detectable magnetic fields responsive to an interrogation field at a larger distance from the system's sensing means.

Figure 6:
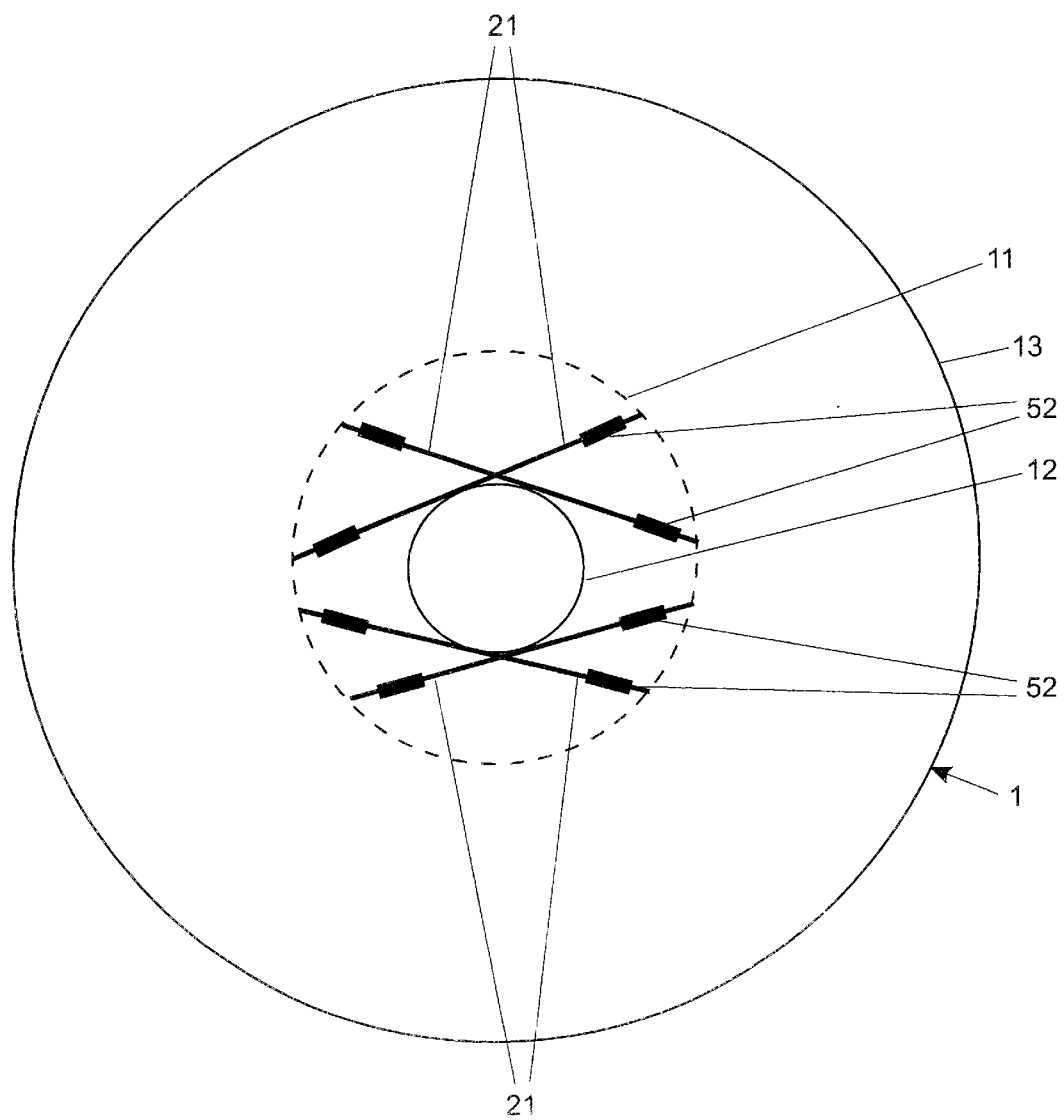
FIG. 6 is a plan view depicting the marker configuration of FIG. 4 with small pieces 52 of semi-hard magnetic material attached to the soft magnetic marker strips 21 for deactivation purposes.

In FIGS. 4 and 6 there is depicted an embodiment of the invention that exhibits an especially advantageous arrangement of magnetic strips. Specifically, these magnetic strips provide an improved aspect ratio, which causes them to be more detectable than many prior art designs. In this FIG. 4 embodiment, the two sets of intersecting magnetic strips 21, when excited by an appropriate magnetic field also exhibit a substantially improved magnetic flux over many prior art designs. These flux lines are approximated by lines "G" FIG. 4. As shown therein, the flux lines extend outwardly from the disk when sufficiently excited, and thereby provide a more detectable magnetic field than prior art designs such as those depicted in FIGS. 1a and 1b.

Figure 5:
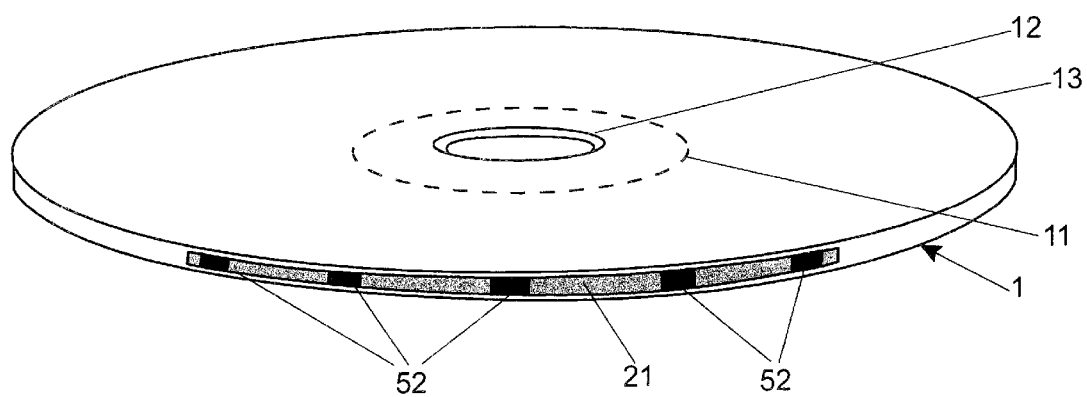
FIG. 5 is a perspective view showing an example of the present invention in which semi-hard magnetic pieces 52 are attached to the soft magnetic strips 21 for deactivation purposes, and a non-magnetic counterbalance material, best visible in FIG. 3, is attached on the other side of the rim surface 13.

Any of the embodiments discussed above with reference to FIGS. 2a, 2b, 2c, 3 and 4 may be modified to be selectively deactivated by associating with or attaching to the magnetic strips 21 small pieces of semi-hard magnetic material. One such illustrative modification is a variation of the embodiment of FIG. 3, which is illustrated by FIG. 5. Thereon are illustrated a plurality of small pieces of semi-hard magnetic material 52 associated with the magnetic strip 21. A further such illustrative modification is a variation of the embodiment of FIG. 4 as is illustrated on FIG. 6. Therein are depicted a plurality of semi-hard magnetic pieces 52 attached to the soft magnetic strips 21 embedded in the media 21. In such embodiments of the invention, the semi-hard magnetic pieces are in demagnetized states during interrogation after which a marker undergoes a dc magnetic field large enough to saturate the soft magnetic marker strips magnetically for deactivation. Those skilled in the art will appreciate that although not shown, the embodiments described in FIGS. 2a, 2b and 2c might be easily varied to also include one or more pieces of semi-hard magnetic material associated with the magnetic strip 21, thereby providing selective deactivation to those embodiments as well.

In each of the embodiments described hereinabove, the magnetic strip 21 is preferably composed of a 'soft' magnetic material, especially an amorphous metal or "glassy alloy", which demonstrates high magnetic permeability and low coercivity. Particularly preferred are commercially available amorphous metals such as METGLAS® 2714A, METGLAS® 2705M, METGLAS® 2827A, and the like.

In accordance with particularly preferred embodiments of the invention, the media 1 is an optically recordable or optically recorded disk, especially a "CD", "CD-R", "CD-RW", "DVD", "LD", or the like, and the magnetic strip 21 is positioned within or adhered to one or more areas of the media 1 which is not within the optically recorded/optically recordable section of the media 1.

In a further aspect the invention provides an improved method for the manufacture of either pre-recorded media, or recordable media, which method includes the step of associating an improved marker capable of being sensed by electronic article surveillance systems directly with the aforesaid media.

Yet a further aspect of the invention provides an improved method for the manufacture of either pre-recorded media, or recordable media, which method includes the step of integrating an improved marker capable of being sensed by electronic article surveillance systems directly with the aforesaid media during or subsequent to the manufacture of the aforesaid media.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLES

Preparation of Metallic Glass Alloys

The metallic glass alloys used in the present invention were rapidly quenched with a cooling rate of approximately $10^6$ K/s from the melt following the techniques taught by Chen et al in U.S. Pat. No. 3,856,513, the contents of which are herein incorporated by reference. The resulting ribbons, typically 10 to 30 m thick and 0.5 to about 8 cm wide, were determined to be free of significant crystallinity by x-ray diffractometry (using Cu—K radiation) and differential scanning calorimetry. The metallic glass alloys in the ribbon form were strong, shiny, hard and ductile.

The as-cast ribbons were slit into narrower ribbons of width ranging from about 0.5 mm to 3 mm and cut into strips with length ranging from about 10 mm to 180 mm. Some of the ribbons were annealed prior to cutting to change the magnetic properties of the as-cast ribbons. The annealing temperatures were between 200 and 400° C. The annealing was performed with or without magnetic fields.

The cut strips were arranged to achieve desired marker configurations according to the prior art, as well as according to the present invention as described herein.

Detection of Harmonic Signal Voltages

The markers prepared in accordance with the sample preparation procedures described above were placed in an exciting ac field at a predetermined fundamental frequency and its higher harmonics response was detected by a coil containing the marker. The exciting coil and signal detecting coil were wound on a bobbin with a diameter of about 50 mm. The number of windings in the exciting coil and the signal-detecting coil was 180 and 250, respectively. The voltage across the primary winding was kept at 80 mV and the fundamental exciting field was set at 2.4 kHz. The 25th harmonic signal then was at 60 kHz. The harmonic response signal for each sample marker across the detection coil was monitored by a digital voltmeter and by a conventional oscilloscope, and reported in the corresponding table.

Comparative Examples

Table 1 compares the signals detected in an experimental set-up from the markers of FIGS. 1a and 1b, which are produced in accordance with the teaching of U.S. Pat. No. 5,699,047.

The 25th harmonic signal voltages were detected in the manner described above. The tested strips of FIG. 1a had a width of 1 mm and a length of 29 mm and a thickness of about 18 μm and were cut from commercially available unannealed METGLAS®2705M ribbon. The double strips were separated by about 13 mm. The marker of FIG. 1b was cut from 75 mm wide, 18 μm thick METGLAS® 2705M ribbon. The fundamental excitation frequency was 2.4 kHz and its level was 80 mV.

TABLE 1

| | Marker Configuration | Signal Voltage (mV) |
|---|---|---|
| Comp.1 | Double Strips of FIG. 1a | 20 |
| Comp.2 | Single Magnetic Piece of FIG. 1b | 20 |

The above signal voltages are too weak to be detected in a conventional surveillance system in which much more than 100 mV is required for reliable surveillance. This can be better understood from a review of the marker configuration from U.S. Pat. No. 5,699,047. Therein, FIG. 1a illustrates a marker and an arrangement for disks optically recorded on both sides of the disk faces. Thereon, the marker strips 10 are essentially closed magnetically due to magnetic proximity of the two strips and therefore do not emanate enough magnetic field outside the disk area in response to an interrogating magnetic field. Thus detection of the presence of the marker at some distance from the marker becomes increasingly difficult as the distance increases. In a typical surveillance system, this distance between the marker and the detecting coil is of the order of 1 to 2 meters. For the same reason, the configuration depicted in FIG. 1b does not improve the situation. The marker configuration of FIG. 1b results in a larger magnetic volume, but does not effectively increase the detection signal amplitude. Since the magnetic path is closed, the fringe magnetic field emanating from the FIG. 1b marker is too weak to be detected at some distance from the marker.

Examples of the Invention

Table 2 compares the signal responses for two arcuate strips, produced in accordance with the present invention.

The 25th harmonic signal voltages were detected in the manner described above. The tested strips 21 of FIG. 2a had a width of 0.5 or 0.65 mm and a thickness of about 18 μm and lengths between 50 and 80 mm and were cut from commercially available METGLAS® 2705M and METGLAS® 2827A ribbon. Annealed ribbon was prepared under heat-treatment condition of 370° C. for one hour with a field of about 10 Oe applied along the strip direction. The arcuate strips were curved to a diameter of about 35 mm. The flat arcuate piece of FIG. 2c was cut from an annealed METGLAS® 2705M ribbon and had a width of about 3 mm, a thickness of about 18 μm and circumference length of about 58 mm. The fundamental excitation frequency was 2.4 kHz and its level was 80 mV.

TABLE 2

| | Marker Configuration | Harmonic Voltage Response (mV) |
|---|---|---|
| Ex.1 | 76 mm long strip of FIG. 2a (METGLAS ® 2705 M ribbon) | 490 |
| Ex.2 | 50 mm long strip of FIG. 2a (METGLAS ® 2705 M ribbon) | 220 |
| Ex.3 | Semi-circular piece of FIG. 2c (METGLAS ® 2705 M ribbon) | 275 |
| Ex.4 | 80 mm long strip of FIG. 2a (METGLAS ® 2827A ribbon) | 330 |
| Ex.5 | 75 mm long strip of FIG. 2a (METGLAS ® 2827A ribbon) | 680–860 |
| Ex.6 | 70 mm long strip of FIG. 2a (METGLAS ® 2827A ribbon) | 700–820 |
| Ex.7 | 70 mm long 0.5 mm wide annealed strip of FIG. 2a (METGLAS ® 2827A ribbon) | 800–1,200 |

The harmonic voltage responses ranging from about 200 mV to 1,200 mV of the markers of the present invention are much greater than those (~20 mV) of the prior art marker configuration given in Table 1. The effective length of the markers above or below the lengths given in Table 2 tends to reduce the harmonic response voltages.

Table 3 summarizes the signal responses from the markers of FIG. 3 according to the invention. The 25th harmonic signal voltages detected as described above. The tested strips 31 of FIG. 3 had a width of about 0.5 and 1.0 mm and a thickness of about 18 μm and lengths of 152 and 76 mm and were cut from commercially available unannealed METGLAS® 2705M, METGLAS® 2714A and METGLAS® 2827A ribbon. The arcuate strips were curved to a diameter of about 111 mm. The fundamental excitation frequency was 2.4 kHz and its level was 80 mV.

TABLE 3

| | Marker Configuration | Harmonic Response Voltage (mV) |
|---|---|---|
| Ex. 8 | 152 mm long 0.5 mm wide strip (METGLAS ® 2705M ribbon) | 2,620 |
| Ex. 9 | 76 mm long 0.5 mm wide strip (METGLAS ® 2705M ribbon) | 1,400–1,500 |
| Ex. 10 | 152 mm long 1 mm wide strip (METGLAS ® 2714A ribbon) | 2,800 |
| Ex. 11 | 76 mm long 1 mm wide strip (METGLAS ® 2714A ribbon) | 1,200 |
| Ex. 12 | 152 mm long 1 mm wide strip (METGLAS ® 2827A ribbon) | 2,130 |
| Ex. 13 | 76 mm long 1 mm wide strip (METGLAS ® 2827A ribbon) | 840 |

Considerably higher harmonic response voltages ranging from about 0.84 volts to 2.8 volts were generated in the inventive marker configuration of FIG. 3 than in the inventive configuration of FIG. 2 which resulted in the voltage responses ranging from about 0.2 volts to 1.2 volts, which is still quite satisfactory.

Table 4 summarizes the signal responses from the markers having the configurations described on FIG. 4 according to the present invention. The 25th harmonic signal voltages were detected in the manner described above. The tested strips 41 of FIG. 4 had a width of 0.5–1 mm and a thickness of about 18 μm and lengths ranging from about 30 to about 34 mm and were cut from commercially available METGLAS®2705M, METGLAS® 2714A or METGLAS®2827A ribbon. The fundamental excitation frequency was 2.4 kHz and its level was 80 mV.

TABLE 4

| | Marker Configuration | Harmonic Response Voltage (mV) |
|---|---|---|
| Ex. 14 | Configuration of FIG. 4 with 1 mm wide strips | 170 |
| Ex. 15 | Configuration of FIG. 4 with 0.5 mm wide strips | 250 |

As can be seen from the reported results, significant improvements in the harmonic response voltages ranging from 170 mV to 250 mV were obtained over the voltages ranging from about 20 mV for the prior art configurations of FIG. 1.

Having thus described the invention in rather full detail, it will nonetheless be understood that this detail need not be strictly adhered to but that further changes and modifications may suggest themselves to one skilled in the art, all falling within the scope of the invention as defined by the subjoined claims.

What is claimed is:

1. A harmonic responsive electronic article surveillance marker for an optically recorded or recordable media having two surfaces, a central, non-recorded region, and a peripheral non-recorded region, said marker comprising at least one elongated strip composed of soft magnetic material adapted to generate a harmonic signal voltage in the presence of an applied magnetic field which provides the marker with signal identity, said strip having an arcuate shape and faces that are perpendicular to said surfaces of said media.

2. A harmonic responsive electronic article surveillance marker, as recited by claim 1, wherein said strip has an arcuate shape, and is contained within a thin element, said thin element being fixedly attached to said central nonrecorded region.

3. A harmonic responsive electronic article surveillance marker, as recited by claim 1, wherein said central nonrecorded region has a peripheral portion, and said strip is embedded in said peripheral portion of said central nonrecorded region.

4. A harmonic responsive electronic article surveillance marker, as recited by claim 2 or 3, wherein said strip has a linear length ranging from about 50 mm to about 80 mm, a width of less than about 1 mm and a thickness of about 10–25 μm.

5. A harmonic responsive electronic article surveillance marker, as recited by claim 1, wherein said arcuate marker has a circumference length ranging from about 50 mm to about 80 mm, a width of less than about 3 mm and a thickness of about 10–25 μm.

6. A harmonic responsive electronic article surveillance marker, as recited by claim 1, wherein said peripheral nonrecorded region has a rim, and said strip is fixedly attached to said rim.

7. A harmonic responsive electronic article surveillance marker, as recited by claim 6, wherein said strip has a linear length ranging from about 50 mm to about 170 mm, a width of less than about 1 mm and a thickness of about 10–25 μm.

8. A harmonic responsive electronic article surveillance marker, as recited by claim 6, wherein said strip has a linear length ranging from about 70 mm to about 160 mm, a width of less than about 1 mm and a thickness of about 10–25 μm.

9. A harmonic responsive electronic article surveillance marker, as recited by claim 1, wherein said peripheral non-recorded region has a rim and said strip is embedded near said rim.

10. A harmonic responsive electronic article surveillance marker, as recited by claim 9, wherein said strip has a linear length ranging from about 50 mm to about 170 mm, a width of less than about 1 mm and a thickness of about 10–25 μm.

11. A harmonic responsive electronic article surveillance marker, as recited by claim 9, wherein said strip has a linear length ranging from about 70 mm to about 160 mm, a width of less than about 1 mm and a thickness of about 10–25 μm.

12. A harmonic responsive electronic article surveillance marker, as recited by claim 1, comprising a non-magnetic counterbalance material having an effective weight corresponding to the mass of said soft magnetic strip.

13. A harmonic responsive electronic article surveillance marker, as recited by claim 1, further comprising a plurality of semi-hard magnetic pieces attached to said soft magnetic strip and being operable in the presence of a deactivating magnetic field, to disarm said marker.

14. A harmonic responsive electronic article surveillance marker, as recited by claim 1, wherein said strip has an aspect ratio of at least 20.

15. A harmonic responsive electronic article surveillance marker, as recited by claim 14, wherein said aspect ratio ranges from about 50 to 900.

16. A harmonic responsive electronic article surveillance marker, as recited by claim 15, wherein said aspect ratio ranges from about 100 to 650.

17. A harmonic responsive electronic article surveillance marker for an optically recorded or recordable media having a central, non-recorded region, and a peripheral non-recorded region, comprising at least two strips composed of soft magnetic material adapted to generate a harmonic signal voltage in the presence of an applied magnetic field which provides the marker with signal identity, each of which is substantially straight and adapted to intersect the other at a point intermediate the ends thereof and within said non-recorded region.

18. A harmonic responsive electronic article surveillance marker, as recited by claim 17, wherein said strip has a linear length ranging from about 30 mm to 34 mm, a width of less than about 1 mm and a thickness of about 10–25 μm.

19. An optically recorded or recordable media having two surfaces and a central, non-recorded region and a peripheral non-recorded region, said media comprising a harmonic responsive electronic article surveillance marker comprising at least one elongated strip composed of soft magnetic material adapted to generate a harmonic signal voltage in the presence of an applied magnetic field which provides the marker with signal identity, and said strip having an arcuate shape and faces that are perpendicular to said surfaces of said media.

20. An inventory control method comprising the steps of:

a. subjecting an elongated marker to an interrogating field, the elongated marker having been directly attached to recordable or recorded media having two surfaces and the marker comprising at least one elongated strip composed of soft magnetic material adapted to generate a harmonic signal voltage in the presence of an applied magnetic field which provides the marker with signal identity, said strip having an arcuate shape and faces that are perpendicular to said surfaces of said media;

b. detecting a signal response of said marker;

c. comparing the detected signal response to a predetermined signal characteristic; and d. transmitting information concerning surveillance status of said marker to means for triggering an alarm, or establishing a marker count when said predetermined signal characteristic is identified.

* * * * *